Patented Oct. 11, 1949

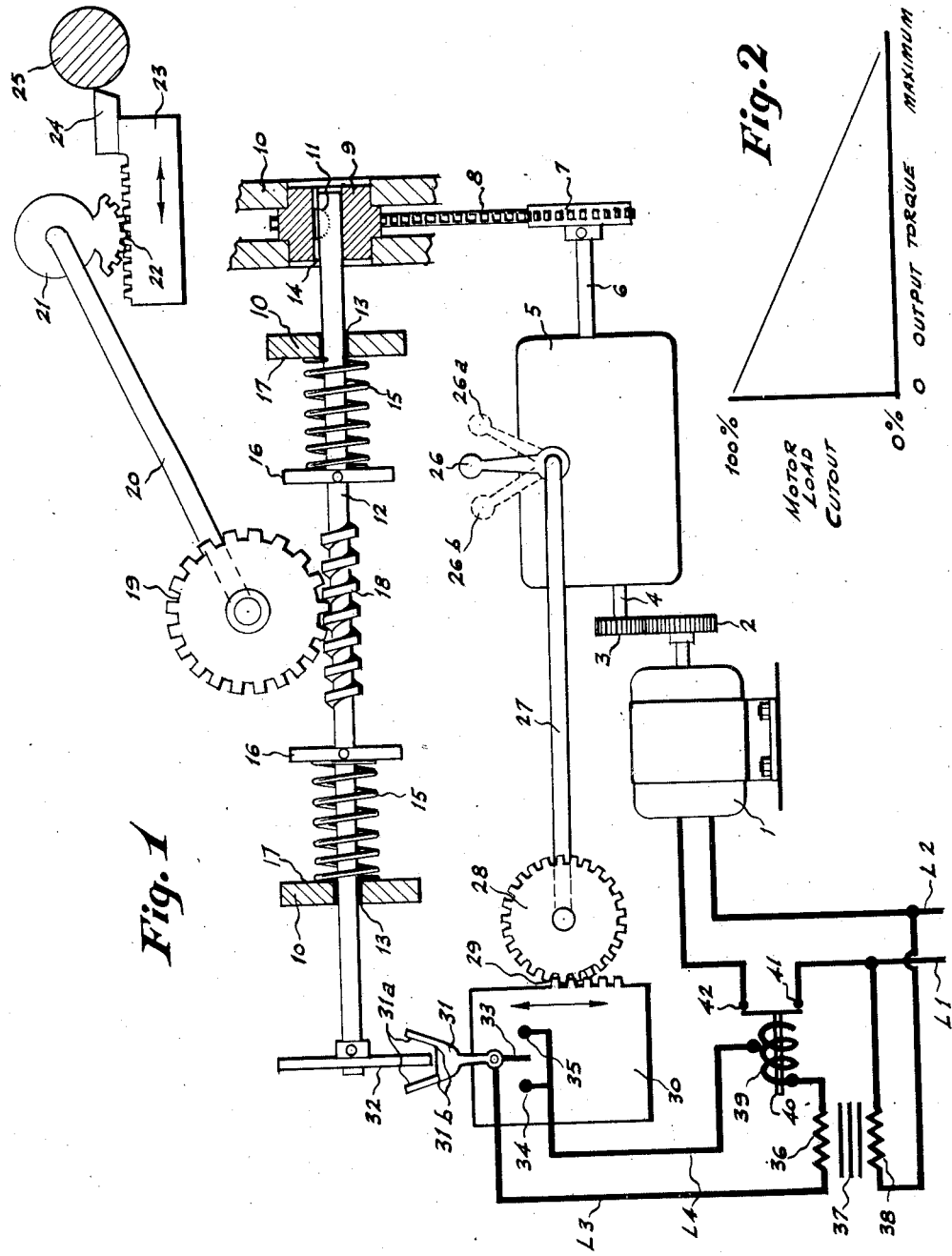

2,484,616

UNITED STATES PATENT OFFICE 2,484,616

OVERLOAD CONTROL MECHANISM

William B. Dulaney, Cincinnati, Ohio, assignor to The Cleveland Automatic Machine Company, Norwood, Ohio, a corporation of Ohio Application January 3, 1947, Serial No. 720,111

7 Claims. (Cl. 82—24)

This invention pertains to overload control mechanism particularly adapted to machine tool power transmissions.

Usually when it is desired to provide a machine tool with an overload device for cutting out the motor under certain load conditions, such device is included as an integral part of the electrical power supply circuit to the drive motor. Such overload control mechanism is only responsive to the load directly applied to the motor and is responsive only to a certain predetermined overload effect produced on said drive motor. This setting is permanent regardless of the load applied to the member being actuated by the drive motor. This is particularly true in a machine tool where the load on the cutting tool itself and the rate of feed do not directly control the stopping of the drive motor. While such overload device generally provides an effective cut-off when a high feed is being used, it is ineffective as a drive mechanism protecting device when a feed is used which brings about conditions under which a load less than the single, fixed load provided for by the permanently set device would prove harmful to the drive mechanism.

Accordingly, an object of this invention is to provide a method in which the tripping pressure necessary to cut out the motor of a machine tool under certain predetermined overload conditions is automatically determined and effected with the selection of any desired cutting tool feed.

Another object of this invention is to provide a protecting device for a drive motor and associated transmission mechanism which is responsive to the variation of a change speed transmission so that the motor will be automatically cut out at a lower load condition when a high ratio high torque output drive from the transmission is being effected.

Still another object of this invention is to provide, in a machine tool transmission drive including a main drive motor and a variable speed transmission mechanism, an arrangement for automatically varying the cut out of power to the main drive motor in relationship to a predetermined series of speed rate selections effected in said change speed transmission.

Further features and advantages of this invention will appear from a detailed decription of the drawings in which:

Figure 1 is a diagram showing an exemplary application of this invention to a machine tool feed drive mechanism.

Figure 2 is a diagram of a chart showing the relationship of motor load cut out to output torque applied by the change speed transmission to the feed mechanism.

Referring to Figure 1, there is shown a machine tool having a main drive motor 1 which is energized from a source of current through leads L1 and L2. The main drive motor 1 has a drive gear 2 which is connected to drive the gear 3 of an input shaft 4 of a variable speed transmission 5. This variable speed transmission 5 may be of any ordinary type such as a change gear feed box, a variable V-belt speed drive transmission, fluid drive transmission, or the like. The output shaft 6 from the variable speed transmission 5 has a sprocket 7 over which operates a chain 8 driving a sprocket 9 which is journaled in the frame 10 of the machine tool. A suitable key 11 fixed in the worm shaft 12, which is journaled in suitable bearings 13 in the machine frame 10, allows axial movement of the shaft 12 and key 11 in the key way 14 of sprocket 9. Thus, the shaft 12 is free to reciprocate axially while at all times being driven from the drive motor 1 through the variable speed transmission 5, chain 8, and the sprocket 9.

Worm shaft 12 is axially shiftable and is resiliently positioned axially by means of coil springs 15 which are placed around the worm shaft 12 between the collars 16 fixed to the worm shaft 12, and the faces 17 of the machine frame 10.

The worm shaft 12 has a worm 18 formed thereon which engages a worm wheel 19 fixed on a shaft 20 suitably journaled in the machine tool frame. Fixed on this shaft 20 is a segmental gear 21 which engages a rack 22 of a tool slide 23 having a cutting tool 24 operatively engaging a work piece 25.

The control lever 26 for the variable speed transmission 5, which is used to select different speed outputs for the output shaft 6, is also connected to a shaft 27 having a gear 28 connected to a rack 29 of an adjustable member 30 carrying a control switch having a V-shaped arm 31 which is actuated by trip dog 32 fixed to the worm shaft 12.

In operation, if the pressure between the tool 24 and the work 25 exceeds a predetermined amount so as to arrest rotation of the gear 19 while the motor 1 is energized in feeding the tool 24 relative to the work 25, the worm shaft 12 will shift axially in either direction as permitted by the yielding springs 15, depending upon the direction of cutting action of work 25 and tool 24. Thus, whenever the V-shaped lever 31 is engaged and actuated by annual trip dog 32 fixed on the shaft 12 to engage its switch arm 33 with either terminal 34 or 35, a circuit is completed through lead L3, secondary coil 36 of the transformer 37 (which transformer has its primary coil 38 connected to leads L1 and L2), relay coil 39, and the lead L4. This current energizes the relay coil 39 so as to move its switch arm 40 out of contact with terminals 41 and 42 thus breaking the current in line L1 to the main drive motor 1.

When the V-shaped lever 31 is moved in a vertical direction, Figure 1, by the rack 29, the gear 28, the shaft 27, and the lever 26, the distance that the worm shaft 12 will have to shift before the trip dog 32 will contact the V-shaped lever 31 is either comparatively great or small, depending on whether the trip dog 32 will be contacting the top or wide portion 31a of the V-shaped lever or its bottom or narrow portion 31b. This change in distance that the trip dog 32 must move before contacting and operating the V-shaped lever 31 allows for the drive motor 1 to be tripped out in relationship to the feed selected by use of lever 26.

Thus, whenever the feed rate selector 26 is moved toward position 26a so as to effect a slow rate of output in the shaft 6, that is, a high reduction from the motor 1 to the output shaft 6, the V-shaped switch member 31 is moved so as to bring the narrow crotch portion 31b up close to the trip dog 32 so that relatively slight axial deflection of the shaft 12 in opposition to the springs 15 will trip the switch arm 33 and thus stop the drive motor 1. When the speed rate selector lever 26 is moved to position 26b so as to effect a high output or substantially one to one output drive from the main drive motor to the output shaft 6, the switch lever 31 will be so positioned that its wide outer V portion 31a will be presented to the end of the trip dog 32. Under these conditions, a much greater axial deflection of the worm shaft 12 is necessary before the motor 1 is tripped by the switch 31. The control lever 26 thus simultaneously effects both the feed rate changes and the load at which the motor 1 will be tripped out.

As noted in Figure 2, the inter-relation of the feed rate selection and the tripping load on the motor takes place in such a way that high torque, slow feeds effect tripping of the motor under much lower load factors than substantially one to one ratio outputs through the feed transmission. In this way, the feed mechanism is always protected in relation to the load between work and tool independent of the actual load applied to the motor for any feed rate selected.

Thus, instead of there being only one overload condition at which point the motor will be cut off, this arrangement will provide a method for cutting out the motor under load conditions which vary with the feed used. This provides uniform protection for the power transmission mechanism under all operating conditions of any feed rate selected.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a power transmission control mechanism, a source of power, a variable speed transmission driven by said source of power, means driven from said variable speed transmission, means for regulating said variable speed transmission, means for cutting off said source of power, and means actuated by said regulating means to adjust the last mentioned means so that said source of power is cut out at predetermined different load conditions relative to the output ratio selected for said variable speed transmission.

2. In a machine tool having, a motor, a variable speed transmission driven by said motor, means for regulating said variable speed transmission and, feed mechanism driven by said variable speed transmission for operatively engaging a tool with a work piece, the combination of means for de-energizing said motor by the pressure between said tool and said work piece, and means actuated by the means which regulate said variable speed transmission to adjust the means which de-energize said motor.

3. In a machine tool, having a motor, a variable speed transmission driven by said motor, means for regulating the torque output of said variable speed transmission, means driven by said torque output so as to operatively engage a tool with a work piece, the combination of electrical control means responsive to pressure between said work and said tool for de-energizing said motor, and means operated by said regulating means for said torque output of said transmission so that said motor will be de-energized at different load conditions automatically determined by the selection of said torque output.

4. In a machine tool having, a motor, a variable speed transmission driven by said motor, means for regulating the torque output of said variable speed transmission, feed mechanism driven by said torque output of said variable speed transmission, and a tool connected to said feed mechanism so as to operatively engage a work piece, the combination of an electrical device for de-energizing said motor by the pressure between said work and said tool, and means for interconnected between said electrical device and said means for regulating said torque output of said variable speed transmission actuated by operation of said torque regulating means to cause said motor to be de-energized at load conditions in a predetermined relationship to speeds selected for said variable speed transmission.

5. In a machine tool comprising, a motor, a variable speed transmission driven by said motor, means for regulating the torque output of said variable speed transmission, feed mechanism driven by said torque output of said variable speed transmission, and a tool connected to said feed mechanism so as to operatively engage a work piece, the combination of a control means for stopping said motor, means for actuating said control means by a shiftable element which is responsive to the pressure between said work and said tool, means for adjusting said control means relative to said shiftable element, and means connected to simultaneously adjust said last mentioned means and said variable speed transmission so as to vary the load cut off of said motor in a predetermined relationship to the torque ratio selected in said variable speed transmission.

6. In a machine tool including a motor, a variable speed transmission driven by said motor, means for regulating the torque output of said variable speed transmission, feed mechanism driven by said torque output of said variable speed transmission, and a tool actuated by said feed mechanism so as to operatively engage a work piece, the combination of means to cause an element of said feed mechanism to shift in response to pressure engagement between said work and said tool, electrical control means actuated by said shiftable elements so as to de-energize said motor, means for adjusting said electrical control means relative to said shiftable element of said feed mechanism, including a regulating member interconnected between said adjusting means and the regulating means for the torque output of said variable speed transmission and operable by adjustment of said torque regulating means so as to vary the load cut-off of said motor in a predetermined relationship to the torque ratio selected in said variable speed transmission.

7. In a machine tool having, a motor, a variable speed transmission driven by said motor, means for regulating the torque output of said variable speed transmission, feed mechanism driven by said torque output of said variable speed transmission, and a tool actuated by said feed mechanism so as to operatively engage a work piece, the combination of means to cause an element of said feed mechanism to shift in response to pressure engagement between said work and said tool, an electrical device for de-energizing said motor, a switch arm for regulating the current through said electrical device, means actuated by said shiftable element of said feed mechanism to engage and actuate said switch arm, means for varying the position of said switch arm relative to the shiftable element of said feed mechanism including, means for interconnecting said last mentioned means with said means for regulating the torque output of said variable speed transmission so that by adjustment of said torque regulating means causes said motor de-energized at varying load conditions simultaneously determined with each selection of torque output in said variable speed transmission.

WILLIAM B. DULANEY.

REFERENCES CITED

The following references are of record in the file of this patent:

UNITED STATES PATENTS

| Number | Name | Date |
|---|---|---|
| 2,080,145 | Maurer | May 11, 1937 |
| 2,209,037 | Riegger | July 23, 1940 |
| 2,222,716 | Mageoch | Nov. 26, 1940 |